United States Patent Office 3,178,454
Patented Apr. 13, 1965

3,178,454
EPOXY ESTERS OF ALPHA,ALPHA-DIALKYL MONOCARBOXYLIC ACIDS
Nantko Kloos and Jacques J. J. Drost, Amsterdam, Netherlands, assignors to Shell Oil Company, New York, N.Y., a corporation of Delaware
No Drawing. Filed May 13, 1960, Ser. No. 28,865
Claims priority, application Netherlands, May 19, 1959, 239,307
2 Claims. (Cl. 260—348.6)

This invention relates to epoxy esters of alpha,alpha-dialkyl monocarboxylic acids and to their production. The invention relates more particularly to epoxy-alkyl esters of alpha,alpha-dialkyl alkane monocarboxylic acids and to their preparation.

The epoxy esters of the present invention are epoxy esters of secondary and tertiary monocarboxylic acids characterized by the presence of at least two alkyl groups linked by saturated carbon-to-carbon linkage directly to the carbon atom which is in the alpha position with respect to the carboxyl carbon atom. These epoxy esters may be represented by the empirical formula:

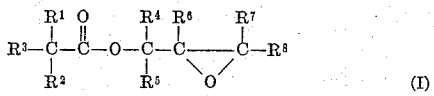  (I)

wherein $R^1$ and $R^2$ each represent the same or different alkyl radicals of normal, branched or cyclic structure, and $R^3$, $R^4$, $R^5$, $R^6$, $R^7$, $R^8$ each represent hydrogen or a hydrocarbyl radical. In the foregoing Formula I, $R^1$ and $R^2$ each may represent a member of the group consisting, for example, of methyl, ethyl, propyl, butyl, pentyl, octyl, decyl, etc. radicals. Hydrocarbyl radicals represented by $R^3$, $R^4$, $R^5$, $R^6$, $R^7$, and $R^8$ in the foregoing Formula I comprise, for example, alkyl radicals of normal, branched or cyclic structure including, methyl, ethyl, propyl, butyl, pentyl, hexyl, octyl, as well as alkaryl, aralkyl, and aryl radicals. The radicals $R^4$, $R^5$, $R^6$, $R^7$, and $R^8$ may furthermore be linked in pairs outside the oxirane ring by carbon-to-carbon linkage as, for example, will be the case when $R^4$ and $R^7$ are linked to form an epoxy cyclohexyl ester. Hydrogen atoms within the above defined epoxy esters may be replaced by substituent groups such as, for example, alkoxy, amino, pyridyl, carboxyphenyl, etc. Comprised within the above defined epoxy esters of alpha,alpha-dialkyl monocarboxylic acids as represented by Formula I, are those wherein the radicals $R^1$, $R^2$, and $R^3$ have a sum total of from 2 to about 20 carbon atoms and the epoxy hydrocarbyl group may contain from 3 to about 20 carbon atoms.

Compounds of primary importance comprised within the above defined class of epoxy esters are the epoxy-alkyl esters of alpha-alkyl alkane monocarboxylic acids, that is those represented by the foregoing Formula I wherein $R^3$, $R^4$, $R^5$, $R^6$, $R^7$, $R^8$ represent hydrogen or an alkyl group. Distinguished from the other members of this class because of structure and characteristics are the epoxy esters of the tertiary monocarboxylic acids defined by the foregoing Formula I when $R^1$, $R^2$, and $R^3$ are each an alkyl group, the lowest member of which is glycidyl pivalate.

The epoxy esters of alpha,alpha-dialkyl monocarboxylic acids of the present invention are obtained by reaction of an alpha,alpha-dialkyl monocarboxylic acid, for example, an alpha-alkyl alkane monocarboxylic acid, or a suitable salt thereof, with a halo-substituted monoepoxide or with a dihalo-hydrin.

The suitable alpha,alpha-dialkyl monocarboxylic acids comprise the acids represented by the general formula

  (II)

wherein $R^1$, $R^2$, and $R^3$ have the same significance as indicated above in Formula I. The suitable alpha,alpha-dialkyl monocarboxylic acids comprise secondary and tertiary acids having from 4 to about 20 carbon atoms to the molecule. A preferred group comprises the acids within this class having from about 9 to about 19 carbon atoms to the molecule. Products of particular value because of their characteristics and utility are obtained when using acids of the above-defined class having from about 9 to about 11 carbon atoms to the molecule. Comprised in the suitable class of alpha,alpha-dialkyl monocarboxylic acids, are for example, pivalic acid (trimethylacetic acid), 2-methylbutanoic, isobutyric acid, isovaleric acid, 2-methylpentanoic acid, 2,4-dimethylvaleric acid, diethylacetic acid, cyclohexane carboxylic acid, etc. A preferred class of the suitable acids comprises the alpha,alpha-dialkyl-alkane monocarboxylic acids and particularly the acids wherein $R^1$, $R^2$, and $R^3$ each represent an alkyl group, as in pivalic acid and its homologues. The acid charge to the process may consist of a single acid or a mixture of two or more such suitable acids. The acids may be obtained from any suitable source. A suitable method for their production comprises that disclosed and claimed in copending applications Serial Nos. 858,796 and 858,797, filed December 10, 1959, now Patent Nos. 3,059,005 and 3,059,006, respectively. Ester products of outstanding characteristics are obtained when using as the acid charge to the process, the alpha,alpha-dialkyl alkane carboxylic acids having from about 9 to about 19 carbon atoms to the molecule obtained by reacting mono-olefins having 8 to 18 carbon atoms to the molecule with carbon monoxide and water in accordance with the process disclosed and claimed in said copending applications Serial Nos. 858,796 and 858,797.

Halo-substituted monoepoxides reacted with the alpha,alpha-dialkyl monocarboxylic acids, or their salts, to obtain the desired esters comprise the halo-substituted monoepoxides containing a carbon atom which is directly linked to a halogen atom and to a carbon atom of an oxirane ring, that is,

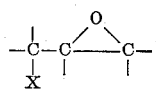

wherein $x$ represents halogen, and the valencies are satisfied by linkage to hydrocarbyl radicals. The chloro-epoxy compounds are generally preferred although the use of the corresponding bromo and fluoro compounds is comprised within the scope of the invention. The halo-substituted epoxide reactants may suitably contain from 3 to about 20 carbon atoms to the molecule. A preferred reactant is 2,3-epoxypropyl chloride (epicholorhydrin). Examples of suitable halo-substituted epoxide reactants are: epibromohydrin, epifluorohydrin, 1-chloro-2,3-epoxybutane, 1-chloro-2,3-epoxyhexane, 1-chloro-2,3-epoxy-4-phenyl octane, 1-chloro-2,3-epoxy-4,5-diethyl dodecane, 3-chloro-4,5-epoxy octane, etc.

When a dihalohydrin constitutes the reactant reacted with the alpha,alpha-dialkyl monocarboxylic acid to obtain the desired esters, the suitable dihalohydrins comprise broadly the hydroxy-dihalo-substituted hydrocarbons containing a halogen atom linked directly to a carbon atom which is, in turn, linked directly to a carbinol carbon atom. The suitable dihalohydrins comprise the fluoro, bromo or chloro-hydrins; the chlorohydrins being generally preferred. The suitable dihalohydrins comprise the hydroxy-dichloro-substituted alkanes containing from 3 to about 20 carbon atoms and having a chlorine atom and a hydroxyl group attached to adjacent carbon atoms. Suitable hydroxy-dichloro-substituted alkanes comprise, for example, 1,3-dichlorohydrin, 1,2-dichlorohydrin, their homologues and analogues.

The epoxy esters of alpha,alpha-diaikyl monocarboxylic acids of the invention may be obtained by the interaction of the above-defined secondary and/or tertiary acids with the suitable halo-substituted monoepoxide or dihalohydrin under any conditions enabling the obtaining of a reaction mixture comprising the desired esters. Thus, they may be prepared by suspending a suitable salt of an alpha-alkyl alkane monocarboxylic acid, preferably in a finely divided solid state, in a liquid phase consisting essentially of an epoxy halo-alkane or containing an epoxy halo-alkane together with a solvent of diluent for the latter. The salts of the monocarboxylic acids used are generally the alkali metal salts, such as the sodium or potassium salts, and occassionally the alkaline earth metal salts. The quaternary ammonium salts of the alpha-alkyl alkane monocarboxylic acids are also very suitable. The epoxy halogen alkane is generally used in excess, for example, in a quantity of from about 1.05 to about 15 times the stoichiometric quantity. The suspension is heated for some time, usually some hours, with stirring. Suitable reaction temperatures comprise those in the range of from about 50° C. to about 150° C. If the epoxy halogen alkane used is epichlorohydrin, the reaction may be carried out at substantially the boiling temperature of this compound, at atmospheric pressure. Suitable catalysts comprise the tertiary amines, such as triethyl amine, triphenyl amine or tricyclohexyl amine; and the quaternary ammonium salts, such as tetramethyl ammonium chloride, tetramethyl ammonium bromide, tetrabutyl ammonium chloride, benzyl trimethyl ammonium chloride, benyl trimethyl ammonium sulphate, cyclo-hexyl trimethyl ammonium bromide, phenyl trioctyl ammonium chloride and diphenyl dimethyl ammonium borate. It is, at times, advantageous to incorporate into the mixture a small additional quantity of an alkaline material, for example, an alkali metal hydroxide, alkali metal carbonate or calcium oxide, in addition to the salt reactant which frequently acts as an alkaline agent. The resulting esters are separated from the reaction mixture by suitable means such as filtration, distillation and/or crystallization.

Production of the foregoing esters of the invention in the manner described above, generally relying upon the use of the salt reactant in an initially dry state, possesses distinct disadvantages often detracting materially from efficient large scale production of the desired esters. A novel method, enabling the more efficient production of the epoxy esters of alpha,alpha-dialkyl monocarboxylic acids has now been found.

In accordance with the process of the invention an aqueous solution of a salt of an alpha,alpha-alkane monocarboxylic acid is reacted with an epoxy halo-alkane. The latter is preferably employed in the liquid state, optionally in the presence of a solvent or diluent. Suitable solvents or diluents comprise, for example, normally liquid hydrocarbons, dioxane, ketones, etc., and mixtures of two or more thereof.

Alkali metal salts and quaternary ammonium salts may be very suitably used as salts of alpha,alpha-alkane monocarboxylic acids. These salts are generally readily soluble in water so that concentrations up to approximately 50% by weight may be used in the solutions. An excess of the epoxy halogen alkane is preferably used, the quantity being generally from about 2 to 15 times, usually about 4 to 10 times, that theoretically required for the conversion of the carboxylic acid. The temperature is generally kept between 50 and 180° C. although temperatures outside this range may be used. Preferred reaction temperatures are in the range of from about 70° C. to about 130° C. If the epoxy halogen alkane used is epichlorohydrin, the reaction may be effected at the boiling temperature of the mixture. The epichlorohydrin and the water may be distilled off together by azeotropic distillation; epichlorohydrin may be recycled to the reaction space. The starting carboxylic acid salt solution is preferably added gradually to the liquid epoxy halo-alkane. The concentration of the water can thus remain very low provided water is removed azeotropically during the course of the process.

In a modification of the process of the invention, a preferably concentrated aqueous alkali metal hydroxide solution is added gradually to a solution of the alpha-alkyl alkane monocarboxylic acid in the epoxy halo-alkane. The carboxylic acid is thereby gradually converted into the corresponding alkali metal salt which then reacts with the epoxy halo-alkane. In this case also, the water introduced into the system may be continuously removed by azeotropic distillation during the course of the process. Epoxy halo-alkane is returned to the reaction.

The novel process of preparation in which the starting materials used are aqueous solutions of salts of alpha-alkyl alkane monocarboxylic acids, has distinct advantages over other preparation techniques, particularly over those in which salts of carboxylic acids are first dried. The process as a whole is greatly simplified by omitting initial drying of the salts. Moreover, the novel process proceeds very readily in the absence of a catalyst with yields approximating theoretical. Salt formed as by-product, for example NaCl, is removed by a simple water washing after completing of the reaction; filtration is generally not necessary. Although the novel process proceeds in the absence of a catalyst, the use of catalysts is, however, comprised within the scope of the invention.

Production of the epoxy esters of alpha,alpha-dialkyl monocarboxylic acids by the reaction of the salt of the alpha,alpha-dialkyl monocarboxylic acid with the suitable halo-substituted monoepoxide is represented by the general reaction:

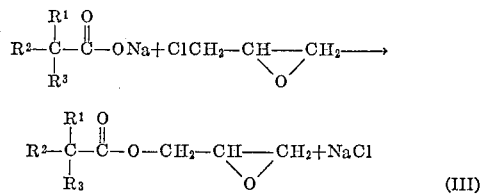

(III)

wherein the R substituents have the significance indicated above in relation to the Formula I.

As indicated above, the alpha,alpha-dialkyl substituted monocarboxylic acid reactant may be used as such rather than its salt to produce the desired esters. The process may then be represented by the reactions:

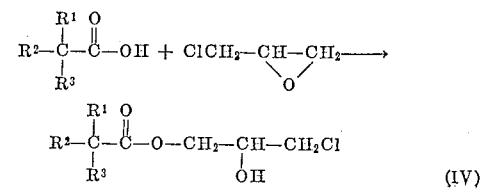

(IV)

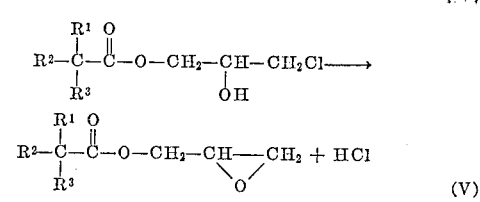

(V)

wherein the R substituents have the meaning given above in relation to Formula I.

Production of the desired esters in accordance with Reaction IV in which the alpha-alkyl alkane monocarboxylic acids are esterified, as such, without previous neutralization, with the epoxy halo-alkanes proceeds fairly readily in the liquid phase. The monocarboxylic acid is dissolved in the epoxy halogen alkane, or else both are dissolved together with the use of an inert solvent. Examples of inert solvents are hydrocarbons, dioxane and/or ketones. Suitable catalysts are organic nitrogen bases, particularly amines such as diethyl amine, triethyl amine, aniline and dimethyl aniline or heterocyclic nitrogen compounds such as pyridine, as well as salts of these nitrogen bases. Suitable temperatures are generally in the range of from about 50° C. to about 180° C. Heating is usually required for starting up the reaction. Since the reaction is exothermic, cooling may be desirable once the reaction is underway. The reaction mixture may be refluxed during the course of the reaction. When the monocarboxylic acid is mixed with the epoxy halo-alkane in a stoichiometric ratio, a halohydrin is formed in high yield. The halohydrin is generally the predominant reaction product even when the epoxy halo-alkane is present in excess.

In a second stage (Reaction V) the intermediate halohydrin product so obtained is converted, by splitting off hydrogen halide, into the monocarboxylic acid epoxy alkyl ester. The splitting off is effected under the influence of a suitable base, for example, hydroxides, carbonates and bicarbonates of alkali metals; borax, oxides and hydroxides of magnesium, zinc, lead, iron and aluminum; and aluminates, silicates and zincates of alkali metals. The base is generally allowed to react with the halohydrin in the form of an aqueous solution or aqueous suspension. The base may, however, be suspended in an inert organic solvent, particularly when aluminates, silicates or zincates are used. The reaction frequently starts without supplying heat, and cooling is generally required. If water is present, the temperature is preferably not allowed to rise higher than about 50° C. When an alkali metal hydroxide is gradually added in the form of an aqueous concentrated solution, water may be removed continuously by azeotropic distillation. In this case temperatures exceeding 50° C. may be used with advantage.

Starting from the monocarboxylic acid reactant and the epoxy halo-alkane, the epoxy alkyl ester of the monocarboxylic acid may be obtained in a single stage by using the epoxy halogen alkane in a quantity which, expressed in mols, is at least twice the quantity of monocarboxylic acid. In this case, it is preferred to use as catalysts tertiary amines and quaternary ammonium salt. Examples of these compounds have already been mentioned above. The remarks made above for the separate execution of Reaction IV also apply to the temperature used in this one-stage process.

When producing the epoxy esters of the alpha,alpha-dialkyl monocarboxylic acids by the reaction of alpha-alpha-dialkyl monocarboxylic acid starting material, in the form of its salt, with a suitable dihalohydrin the following reaction scheme applies:

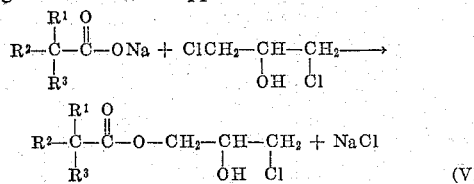

whereupon the epoxy alkyl ester is formed according to the scheme:

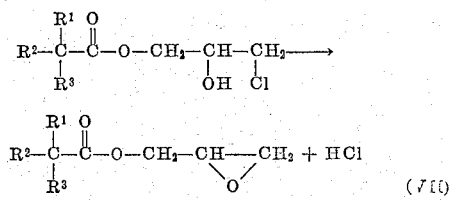

The conditions under which reaction is carried out are generally approximately the same as those suitable for Reaction III described above. The conditions given above for Reaction V may be adhered to for Reaction VII.

Insofar as the organic nitrogen base sand quaternary ammonium salts are used as catalysts in the processes described, they are used in concentrations in the range of from about 0.01 to about 10% by weight, based on the acid to be esterified. On completion of the esterification remnants of these catalysts are readily washed out with water, which water may be acidified if necessary.

*Example I*

The starting materials were alkenes having from 8 to 10 carbon atoms in the molecule. They were obtained as a fraction of a product formed in the thermal vapor-phase cracking of a paraffinic feedstock in the presence of steam. The dienes originally present in this fraction were converted into mono-olefins by partial hydrogenation. The double bonds in the alkenes were substantially present also exclusively between non-terminal carbon atoms.

The alkenes were converted by reaction with carbon monoxide and water into alpha-alkyl-substituted secondary and tertiary alkane monocarboxylic acids having from 9 to 11 carbon atoms to the molecule. The conversion was effected at 60° C. with a CO pressure of 100 atm. The catalyst used contained $H_3PO_4$ and $BF_3$ in equimolar quantities. The crude alpha-alkyl alkane monocarboxylic acids so obtained were neutralized with sodium hydroxide after being separated from the catalyst whereupon the resulting sodium salt solution was freed of hydrocarbons still present by extraction with gasoline. The concentration of the sodium salts in the aqueous solution was subsequently raised to 50% by weight.

A quantity of the latter aqueous solution containing 2 mol of sodium salts of alpha-alkyl substituted alkane carboxylic acids of 9 to 11 carbon atoms was gradually added over a period of 2½ hours to 20 mol of epichlorohydrin; the temperature of the mixture formed being kept between 105° C. and 110° C. During the reaction epichlorohydrin was azeotropically distilled off with water. The two liquids separated in the distillate; the epichlorohydrin was returned to the reactor. The concentration of the water in the reaction mixture was thus kept constant at about 2% by weight.

After the above period the excess of epichlorohydrin was distilled off, first at normal pressure until the bottom temperature was 160° C. and finally at a pressure of 20 mm. Hg at 120° C. The latter temperature and pressure were maintained for one hour.

The crude reaction product was cooled to 50° C. and washed three times with 150 ml. of distilled water to remove NaCl.

The remaining material, consisting essentially of glycidyl ester of alpha-alkyl substituted alkane carboxylic acids of 9 to 11 carbon atoms, was distilled in vacuo after removal of the water.

Boiling point _____ 110–122° C. at 8 mm. Hg.
Yield _____ 90 mol percent.
Epoxy group content __ 0.420 equivalent per 100 grams.
(Theory, 0.424 equivalent per 100 grams.)

*Example II*

An aqueous solution of sodium salt of alpha-alkyl alkane monocarboxylic acids having from 9 to 11 carbon atoms to the molecule was produced substantially as described in the foregoing Example I. The sodium salt solution was acidified with hydrochloric acid as a result of which the carboxylic acids were liberated. The alpha-alkyl alkane monocarboxylic acids of $C_9$ to $C_{11}$ carbons so obtained were dissolved in epichlorohydrin in the molar ratio of acids to epichlorohydrin of 1:10. The resulting solution was maintained at boiling temperature under reflux; an aqueous 50% weight solution of NaOH was gradually added to the reaction mixture over a 2½ hour period in an amount substantially equal to the stoichiometrical equivalent of the monocarboxylic acids used. Water was removed as water-epichlorohydrin azeotrope during the course of the reaction; epichlorohydrin being separated from the distillate and returned to the reaction. At the end of the above period excess epichlorohydrin was distilled from the resulting reaction products by distillation under pressure and completed under vacuum.

The resulting crude reaction product remaining after removal of the unconverted epichlorohydrin was cooled and washed with distilled water. The resulting product, identified as consisting essentially of glycidyl ester of alpha-alkyl alkane monocarboxylic acids of 9 to 11 carbon atoms was distilled under vacuum after removal of water.

Boiling range _____ 110–124° C. at 8 mm. Hg.
Yield _____ 92 mol percent.
Epoxy group content _____ 0.420 equivalent/100 g.
Theory, 0.424 equivalent/100 g.

*Example III*

An aqueous solution of the sodium salt of alpha-alkyl substituted alkane monocarboxylic acids having 9 to 11 carbon atoms to the molecule was produced under substantially identical conditions described in foregoing Example I. The salt was separated from the aqueous solution, dried, and used as charge to the process.

1 mol of the dry salt was suspended in 10 mols of epichlorohydrin. 1.5% by weight of tetramethyl ammonium chloride were added, based on the sodium salt. The suspension was boiled under reflux for 1 hour. The remaining epichlorohydrin was then distilled off, first at normal pressure and afterwards at reduced pressure until a bottom temperature of 120° C. was reached at 20 mm. Hg. The residue was cooled and mixed with 250 ml. of methyl isobutyl ketone. The mixture was filtrated in order to remove NaCl. The catalyst was subsequently removed by washing the mixture three times, each time with 100 ml. of distilled water. After distilling off the ketone the glycidyl ester, consisting essentially of the glycidyl ester of alpha-alkyl alkane monocarboxylic acids having from 9 to 11 carbon atoms to the molecule, was distilled in vacuo.

Glycidyl ester boiling
  point _____. 110–120° C. at 8 mm. Hg.
Yield _____. 93 mol percent.
Epoxy group content _____. 0.420 equivalent per 100 g.

Similarly the epoxy butyl ester, the epoxy hexyl ester, the epoxy octyl ester, and the 2,3-epoxy-4-phenyl octyl ester of the alpha-alkyl alkane monocarboxylic acids of 9 to 11 carbon atoms are prepared by reaction of the corresponding monocarboxylic acids with 1-chloro-2,3-epoxy butane, 1-chloro-2,3-epoxy-hexane, 3-chloro-4,5-epoxy octane, 1-chloro-2,3-epoxy-4-phenyl octane, respectively.

*Example IV*

Glycidyl pivalate is prepared by slowly adding 2 mols of sodium pivalate in aqueous solution to 18 mols of epichlorohydrin. The reaction mixture is maintained at substantially boiling temperature. Water introduced into the system is removed as vapor overhead continuously during the course of the process. Epichlorohydrin carried over with water vapor is separated from water and returned to the reactor. Upon completion of the reaction unconverted epichlorohydrin is distilled off leaving a reaction product consisting essentially of glycidyl pivalate.

The epoxy esters of the alpha,alpha-alkyl substituted monocarboxylic acids of the invention are useful as starting and intermediate materials in the production of valuable chemical products such as macromolecular products, detergents, plasticizers, etc. They are particularly useful as components in non-drying alkyd resins. Alkyd resins possessing particularly desirable characteristics are obtained by the reaction of the esters of the invention with polybasic carboxylic acids or anhydrides thereof at a temperature of 130° C. or higher as described and claimed in copending application Serial No. 29,165, filed May 16, 1960. Use of the epoxy esters of the invention in the production of the alkyd resins enables materials of improved characteristics to be obtained with substantially reduced reaction time, at relatively low temperatures, and in the substantial absence of many of the difficulties heretofore often encountered, such as those resulting from gelling of the reaction mixtures. The alkyd resins so obtained have excellent mechanical properties and are moreover light in color. They are, therefore, particularly suitable for use as base for lacquers and varnishes. The chemical resistance of the alkyd resins is particularly high when epoxy alkyl esters of the alpha-monoalkyl alkyl alkane monocarboxylic acids and/or alpha,alpha-dialkyl alkane monocarboxylic acids of the subject invention are incorporated in their production.

*Example V*

A mixture consisting of: (*a*) 59 grams of the glycidyl esters of alpha-alkyl alkane monocarboxylic acids of 9 to 11 carbon atoms prepared in foregoing Example I; (*b*) 2.5 grams of glycerol; and (*c*) 37 grams of phthalic anhydride was heated 45 minutes in a nitrogen atmosphere up to a maximum temperature of 230° C. After only this short heating period the acid number (number of mg. KOH required to neutralize 1 g.) had already fallen to 6. The resulting product was very light of color and of excellent quality with respect to color stability and chemical resistance.

We claim as our invention:
1. The process for the production of normally liquid vic-epoxy alkyl ester compositions consisting essentially of a mixture of unsubstituted vic-epoxy esters of trialkyl acetic acids of the structure

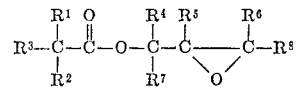

wherein $R^1$, $R^2$ and $R^3$ are each unsubstituted alkyl and have collectively 7 to 17 carbon atoms, and $R^4$, $R^5$, $R^6$, $R^7$ and $R^8$ each represent a member of the group consisting of hydrogen and unsubstituted alkyl having collectively not more than 17 carbon atoms, which process consists of the steps of: reacting at a temperature of from about 50 to about 180° C., an aqueous solution of a member of the group consisting of mixture of alkali metal salts, alkaline earth metal salts and ammonium salts of trialkyl acetic acids of 9 to 19 carbon atoms with from about 1.05 to about 20 times the stoichiometric equivalent, based on said salts, of an unsubstituted 1-halo-2,3-epoxy alkane of 3 to 20 carbon atoms, and separating said vic-epoxy alkyl ester composition from the resulting reaction mixture, said mixtures of salts being derived from admixtures of trialkyl acetic acids of 9 to 19 carbon atoms obtained by acid-catalyzed carboxylation with carbon monoxide and water of olefinic hydrocarbons of 8 to 18 carbon atoms.

2. The process for the production of normally liquid compositions consisting essentially of an admixture of unsubstituted glycidyl esters of $C_{9-11}$ trialkyl acetic acids of the structure

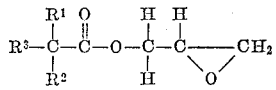

wherein $R_1$, $R_2$ and $R_3$ are each unsubstituted alkyl and have collectively 7 to 9 carbon atoms, which process consists of reacting in liquid phase, at a temperature of from about 50° to about 180° C., an aqueous solution of a mixture of sodium salts of unsubstituted $C_{9-11}$ trialkyl acetic acids with an amount of epichlorohydrin equal to from about 1.05 to about 20 times the stoichiometrical equivalent of said salts, continuously distilling vapors consisting essentially of epichlorohydrin and water from the reaction mixture, separating epichlorohydrin from the distilled vapors, continuously returning separated epichlorohydrin to said reaction, and separating an admixture of unsubstituted glycidyl esters of $C_{9-11}$ trialkyl acetic acids from the resulting reaction mixture, said mixture of sodium salts having been derived from an admixture of $C_{9-11}$ trialkyl acetic acids obtained by acid-catalyzed carboxylation with carbon monoxide and water of $C_{8-10}$ olefinic hydrocarbons.

References Cited in the file of this patent

UNITED STATES PATENTS

| | | |
|---|---|---|
| 2,448,602 | Kester et al. | Sept. 7, 1948 |
| 2,537,981 | Edwards | Jan. 16, 1951 |
| 2,556,075 | Erickson | June 5, 1951 |
| 2,567,842 | Erickson | Sept. 11, 1951 |
| 2,772,296 | Mueller | Nov. 27, 1956 |
| 2,898,349 | Zuppinger | Aug. 4, 1959 |
| 2,999,868 | Phillips et al. | Sept. 12, 1961 |
| 3,004,996 | Arakelian et al. | Oct. 17, 1961 |

FOREIGN PATENTS

| | | |
|---|---|---|
| 766,771 | Great Britain | Jan. 23, 1957 |

OTHER REFERENCES

Kester et al.: Jour. Org. Chem., vol. 8 pages 550-6 (1943).